(12) United States Patent
Friedman et al.

(10) Patent No.: US 7,933,894 B2
(45) Date of Patent: Apr. 26, 2011

(54) PARAMETER-SENSITIVE PLANS FOR STRUCTURAL SCENARIOS

(75) Inventors: Marc T. Friedman, Seattle, WA (US); Cesar A. Galindo-Legaria, Redmond, WA (US); Erik Ismert, Shoreline, WA (US); Milind Madhukar Joshi, Redmond, WA (US); Naveen Prakash, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/763,490

(22) Filed: Jun. 15, 2007

(65) Prior Publication Data

US 2008/0313131 A1 Dec. 18, 2008

(51) Int. Cl.
*G06F 17/30* (2006.01)

(52) U.S. Cl. ........ 707/718; 707/637; 707/713; 707/714; 707/715; 707/716; 707/717; 707/719; 707/720; 707/721; 707/600

(58) Field of Classification Search .................. 707/600, 707/637, 713–721
See application file for complete search history.

(56) References Cited

U.S. PATENT DOCUMENTS

| | | | |
|---|---|---|---|
| 5,930,795 A * | 7/1999 | Chen et al. ............... | 1/1 |
| 6,067,542 A | 5/2000 | Carino, Jr. | |
| 6,356,887 B1 * | 3/2002 | Berenson et al. ........... | 707/2 |
| 6,466,931 B1 * | 10/2002 | Attaluri et al. ............ | 707/2 |
| 6,581,055 B1 | 6/2003 | Ziauddin et al. | |
| 6,615,203 B1 | 9/2003 | Lin et al. | |
| 6,789,071 B1 * | 9/2004 | Kapoor et al. ............. | 707/2 |
| 6,925,472 B2 * | 8/2005 | Kong ...................... | 707/104.1 |
| 6,999,958 B2 | 2/2006 | Carlson et al. | |
| 7,080,062 B1 | 7/2006 | Leung et al. | |
| 7,158,963 B2 | 1/2007 | Galindo-Legaria et al. | |
| 7,529,752 B2 * | 5/2009 | Hinshaw et al. ........... | 1/1 |
| 7,577,667 B2 * | 8/2009 | Hinshaw et al. ........... | 1/1 |
| 7,634,477 B2 * | 12/2009 | Hinshaw ................... | 1/1 |
| 7,698,338 B2 * | 4/2010 | Hinshaw et al. ........... | 707/754 |
| 7,797,286 B2 * | 9/2010 | Sauermann ................ | 707/688 |
| 2004/0117037 A1 * | 6/2004 | Hinshaw et al. ........... | 700/2 |
| 2004/0133565 A1 * | 7/2004 | Hinshaw et al. ........... | 707/3 |
| 2004/0148420 A1 * | 7/2004 | Hinshaw et al. ........... | 709/231 |
| 2004/0205110 A1 * | 10/2004 | Hinshaw ................... | 709/201 |
| 2005/0028134 A1 * | 2/2005 | Zane et al. ................. | 717/106 |
| 2005/0256854 A1 * | 11/2005 | Rajamani et al. ........... | 707/3 |
| 2005/0267866 A1 | 12/2005 | Markl et al. | |
| 2005/0289098 A1 | 12/2005 | Barsness et al. | |
| 2006/0026116 A1 | 2/2006 | Day et al. | |
| 2006/0195416 A1 * | 8/2006 | Ewen et al. ............... | 707/2 |
| 2006/0224563 A1 | 10/2006 | Hanson et al. | |

OTHER PUBLICATIONS

S. Adah, et al. Query Caching and Optimization in Distributed Mediator Systems. 1996. pp. 137-148. http://www.public.asu.edu/~candan/pubs/sigmod96.ps.
Anjali V. Betawadkar. Query Optimization With One Parameter. Feb. 1999. http://citeseer.ist.psu.edu/cache/paper/cs/26172/http:zSzzSzwww.cse.iitk.ac.inzSzresearchzSzmtech1997zSz9711104.pdf/betawadkar97query.pdf.
Yannis E. Ioannidis, et al. Parametric Query Optimization. 1992. pp. 103-114. http://www.vldb.org/conf/1992/P103.PDF.
Sumit Ganguly. Design and Analysis of Parametric Query Optimization Algorithms. 1998. pp. 228-238. http://www.se.cuhk.edu.hk/~yu/papers/dynamic-parametricimplementation-vldb98.pdf.

* cited by examiner

*Primary Examiner* — Frantz Coby
(74) *Attorney, Agent, or Firm* — Turocy & Watson, LLP

(57) ABSTRACT

Systems and methods that generate specialized plans for compiling SQL queries. A plan generator component scans the query representation for parameter sensitive predicates and evaluates each predicate individually based on the parameter values. Accordingly, queries can be identified not only based on their structures, but also based on their parameter conditions. The specialized plans are more efficient for particular values, wherein queries that employ such values are optimally executed.

17 Claims, 10 Drawing Sheets

PARAMETER-SENSITIVE PLANS FOR STRUCTURAL SCENARIOS

BACKGROUND

Advent of a global communications network such as the Internet has facilitated exchange of enormous amounts of information. Additionally, costs associated with storage and maintenance of such information has declined, resulting in massive data storage structures.

Accordingly, it is important to store such data in a manageable manner that facilitates user friendly and quick data searches and retrieval. In general, a common approach is to store electronic data in a database. A database functions as an organized collection of information, wherein data is structured such that a computer program can quickly search and select desired pieces of data, for example. Commonly, data within a database is organized via one or more tables, and the tables are arranged as an array of rows and columns.

Moreover, such tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

In general, each individual piece of data, standing alone, is not very informative. Database applications allow the user to compare, sort, order, merge, separate and interconnect the data, so that useful information can be generated from the data. Moreover, capacity and versatility of databases have grown incredibly to allow virtually endless storage capacity utilizing databases.

Queries in database systems are posed in high level, declarative (non-procedural) languages that are translated into a procedural execution plan. Many relational database management systems employ query optimizers in order to choose a query plan for a given query. The purpose of query optimization is to explore the manners in which this declarative request can be translated into procedural plans and to select the most efficient plan among those explored. The desired query execution plan can consist of a series of primitive database operators, and is typically selected according to a least estimated execution cost.

Query execution in Structured Query Language (SQL) is an integral part of system performance in terms of efficiency, time, accuracy, and cost. The way in which a query is executed can avoid or create problems regarding the quantity of space that needs to be sacrificed to execute the query and the amount of time required to retrieve the query result.

Moreover, in Relational Database Management System (RDBMS), users issue queries against the data that is stored in software constructs. When a user issues a query, the system compiles the query by producing a physical plan that can be executed against the database. For any such query, there are a variety of different physical plans that can be appropriately used. However, each plan is different-some plans will execute the query with a low cost, while other plans will execute the query with a high cost. The step of optimizing a query execution process by costing various plans is inherently expensive.

Therefore, for a class of queries that are similar to one another, one could use the same physical plan to execute those queries and costing could be performed only once for the whole class of queries. In SQL, these queries are identified as parameterized queries, where a user can submit a query with constants missing—those constants are not provided until runtime. In this situation, just one plan will be generated and stored in the plan cache for every query that belongs in that class of queries, effectively avoiding the cost of optimizing more than once for these queries. However, depending on the constant selected, there can be a dramatically wide range of plans corresponding to different costs.

One approach in plan selection is to optimize the first query submission with constants in place and use the selected plan for all subsequent queries in that cost. Another approach in plan selection is to provide the optimizer with a hint when submitting the parameterized query so that optimization will use the suggested constant to generate a plan.

While such approaches ensure that an optimal plan is selected for at least one constant, different plans have different levels of optimality for different constants. Selecting a single plan will almost always be suboptimal for at least some other parameter setting that does not correspond to the initial optimization approach. Thus, a plan that may perform well for some parameter values may perform poorly for other parameter values. In addition, there are parameterized queries for which no plan achieves close to optimal performance.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables generation of specialized plans for compiling Structured Query Language (SQL) queries, via a plan generator component. The plan generator component can scan the query representation for parameter sensitive predicates and evaluates each predicate individually based on the parameter values, wherein queries can be identified not only based on their structures, but also based on their parameter conditions. A specialized compilation plan that is tailored for the query can then be located and executed, or alternatively a compilation plan can be created for parameter values of the query. The specialized plans are more efficient for particular values, wherein queries that employ such values are optimally executed. In one aspect, by evaluating predicates of the query and different parameters (e.g., null, predefined values, and the like), different plans can be obtained.

In a related aspect, a lookup component can search a procedure cache to verify whether a compilation plan for query has been previously cached. If not, such query can be compiled, wherein during the compilation processed to obtain an optimal plan the parameter values are evaluated to verify if they match the predicates. Dispatch expressions can then be formed to match the query values that are evaluated. The dispatch expressions and the compiled plan can then be stored. As such, each query can be associated with a dispatch expression, wherein such dispatch expression is evaluated to obtain an optimal execution for the query.

Hence, the next time a query is received, a procedure cache lookup is performed to locate the plan, wherein the system can determine validity for the parameter values, and ranges/intervals that an execution plan can efficiently execute can thus be determined. For example, the system can run the dispatch expressions and depending on a "False" or "True" result, a decision can be made to re-compile the query or not (e.g., whether new dispatch expressions should be formed.) Hence, the dispatch expressions can specify which execution plan should be chosen from a plurality of stored plans to run a query.

Moreover, pairing between a parameter sensitive plan and an expression that determines a validity (e.g., a guard expression) occurs. For example if guard expression evaluation returns true, then the plan that such guard expression is paired with is considered the correct one to execute. Put differently, the dispatch expression functions as a collection of guard expressions that, instead of simply returning a boolean, can return a key as to which plan to execute. If a guard expression returns true, the dispatch expression can return the appropriate key that the guard expression is associated therewith. Such is an optimized version of running each guard expression in order, until a true result is returned. If more than one dispatch expression is true, the first can be chosen for execution.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
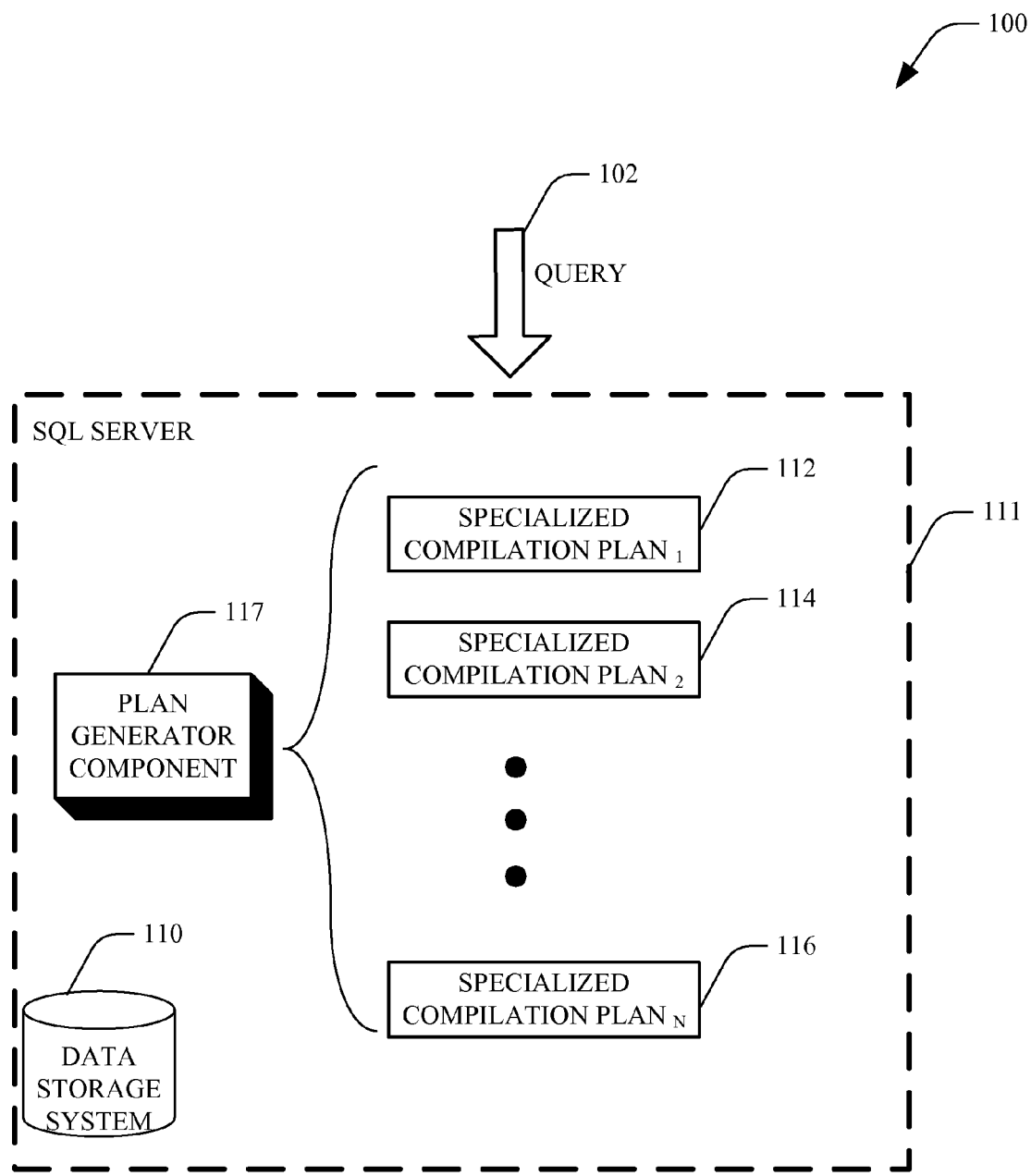
FIG. 1 illustrates a block diagram of a system that employs a plan generator component in accordance with an aspect of the subject innovation.

FIG. 1 illustrates a block diagram of a system 100 that enables generation of specialized compilation plans 112, 114, 116 for compiling SQL queries, via a plan generator component 117. The plan generator component 117 can scan the query 102 representation for parameter sensitive predicates, and evaluate each predicate individually based on the parameter values, wherein query 102 can be identified not only based on its structures, but also based on their parameter conditions (e.g., an expression can be considered as parameter-sensitive if such expression depends on constants, variables, parameters, and non-side-effecting functions.) In general, a parameterized query is a SQL query in which the constants are typically provided until runtime, and the plan generator component 117 produces multiple query plans in form of specialized compilation plans 112, 114, 116, which can be stored with dispatch expressions that encode conditions under which the various plans apply, as described in detail infra.

The specialized compilation plans 112, 114, and 116 can be cached (and retrieved) by the system 100, wherein the system 100 can maintain specialized plans for all non-side-effecting runtime constant predicates that includes parameters and variables. Moreover, the specialized compilation plans 112, 114, 116 can further extend to non-deterministic runtime constants such as "getdate( )", for example. It is to be appreciated that the dispatch expression (and the associated specialized plans) typically do not depend on parameter values as observed by a query processor or specialized compilation plans that remain in cache, and hence predictability can be preserved. Moreover, the plan generator component 117 can be integrated into the cache eviction/plan invalidation schemes, and is further extensible to a scheme for dispatching based on statistical properties of the parameters.

The SQL server 111 can associate with a data storage system 110, wherein such data storage system 110 can be a complex model based at least upon a database structure, wherein an item, a sub-item, a property, and a relationship are defined to allow representation of information within a data storage system as instances of complex types. For example, the data storage system 110 can employ a set of basic building blocks for creating and managing rich, persisted objects and links between objects. An item can be defined as the smallest unit of consistency within the data storage system 110, which can be independently secured, serialized, synchronized, copied, backup/restored, and the like. Such item can include an instance of a type, wherein all items in the data storage system 110 can be stored in a single global extent of items. The data storage system 110 can be based upon at least one item and/or a container structure. Moreover, the data storage system 110 can be a storage platform exposing rich metadata that is buried in files as items. The data storage system 110 can include a database, to support the above discussed functionality, wherein any suitable characteristics and/or attributes can be implemented. Furthermore, the data storage system 110 can employ a container hierarchical structure, wherein a container is an item that can contain at least one other item. The containment concept is implemented via a container ID property inside the associated class. A store can also be a container such that the store can be a physical organizational and manageability unit. In addition, the store represents a root container for a tree of containers within the hierarchical structure.

Figure 2:
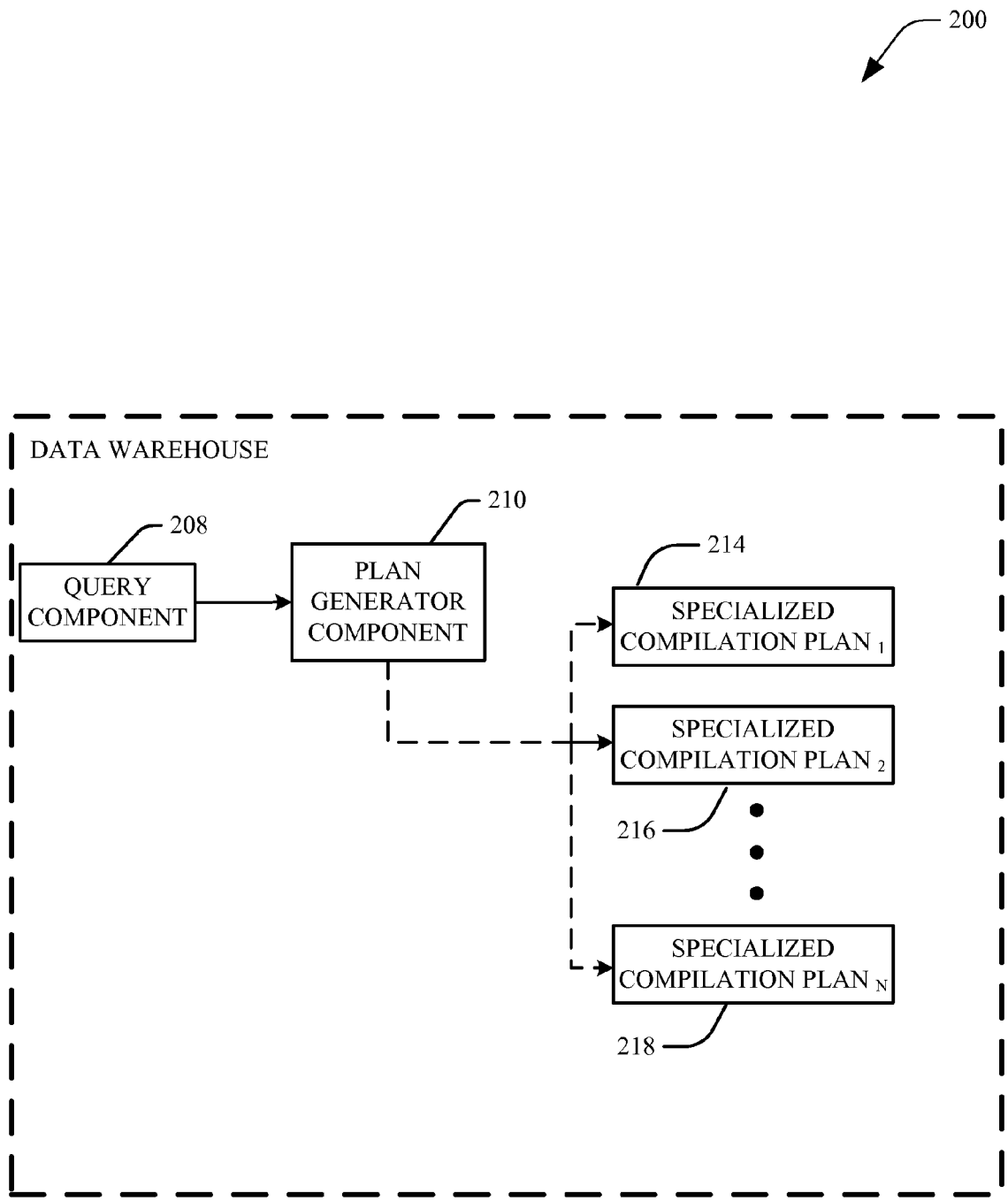
FIG. 2 illustrates a particular system wherein a query component extracts query predicates to facilitate generation of the specialized compilation plans

FIG. 2 illustrates a related system 200 according to one aspect of the subject innovation, wherein a query component 208 can extract query predicates from the query, to facilitate generating the specialized compilation plans 214, 216, 218 (1 to N, where N is an integer.) For example, a predicate can be an expression that asserts a fact about values. If such expression evaluates to TRUE, then the associated condition is satisfied. Otherwise, and if the expression evaluates to FALSE, then the condition is not satisfied.

The query component 208 receives a parameterized query and interacts with the plan generator component 210 to supply multiple specialized compilation plans 214, 216 and 218. Such specialized compilation plans can be tailored for a query, which can then be located and executed, or alternatively a compilation plan is created for parameter values of the query. Such specialized compilation plans are more efficient for particular values, wherein queries that employ such values are optimally executed. In one aspect, by evaluating predicates of the query and different parameters (e.g., null, predefined values, and the like), different plans can be obtained.

For example, the following database query is produced by a form with three optional fields, "actor," "director," and "year", wherein

```
select m.title
from Movies m, MovieActors a, MovieDirectors d, MovieYear y
where
            m.movieid = a.movieid
    AND     m.movieid = d.movieid
    AND     m.movieyear = y.movieyear
    AND     ((a.actor = @actor) or (@actor is NULL))
    AND     ((d.director = @dir) or (@dir is NULL))
    AND     ((y.theyear = @yr) or (@yr is NULL))
```

Given these parameters input by the user:

```
@actor = NULL (i.e., left blank)
@dir = 'David Mamet'
@yr = '2000'
```

The system of the subject innovation can analyze the query/parameters and determine a specialization for the query. Such can collect the fragments of the query that depend on constants, parameters, and runtime constants, and specializes the query for the following conditions, for example:

TABLE 1

| Predicate from input query | Truth value |
|---|---|
| @actor is NULL | True |
| @dir is NULL | False |
| @yr is NULL | False |

Such can represent the dispatch expression generated to calculate the cached plan's index, wherein
(case when @actor is NULL then 0 else 1 end)
|(case when @dir is NULL then 0 else 2 end)
|(case when @yr is NULL then 0 else 4 end)

Such represents a specialized query, after simplification, for these conditions:

```
select m.title
from Movies m, MovieActors a, MovieDirectors d, MovieYear y
where
            m.movieid = a.movieid
    AND     m.movieid = d.movieid
    AND     m.movieyear = y.movieyear
```

```
    AND     d.director = 'David Mamet'
    AND     y.theyear = '2000'
```

In a related example for non-deterministic runtime constants, the following database query (without parameters) can be employed in a secure multi-user system, wherein

```
select w.date, w.amount
from withdrawals w
where AllowAccess(GetDate( ), user_id( )) = 1
```

Initially, the system of the subject innovation can detect a nondeterministic runtime constant and pulls it out, leading to the following equivalent batch, wherein:

```
declare @dt datetime
set @dt = GetDate( )
select w.date, w.amount
from withdrawals w
where AllowAccess(@dt, user_id( )) = 1
```

The system evaluates the WHERE clause and determines it is false, leading to the condition;

TABLE 2

| Predicate from input query | Truth value |
|---|---|
| AllowAccess(@dt, user_id( )) = 1 | False |

Such represents the dispatch expression generated to calculate the cached plan, wherein:
(case when AllowAccess(@dt, user_id( ))=1 then 0 else 1 end)

This represents the specialized query, after simplification, for these parameters. Moreover, any contradiction can be supplied in the WHERE clause, wherein;

```
select w.date, w.amount
from withdrawals w
where 1=0
```

Figure 3:
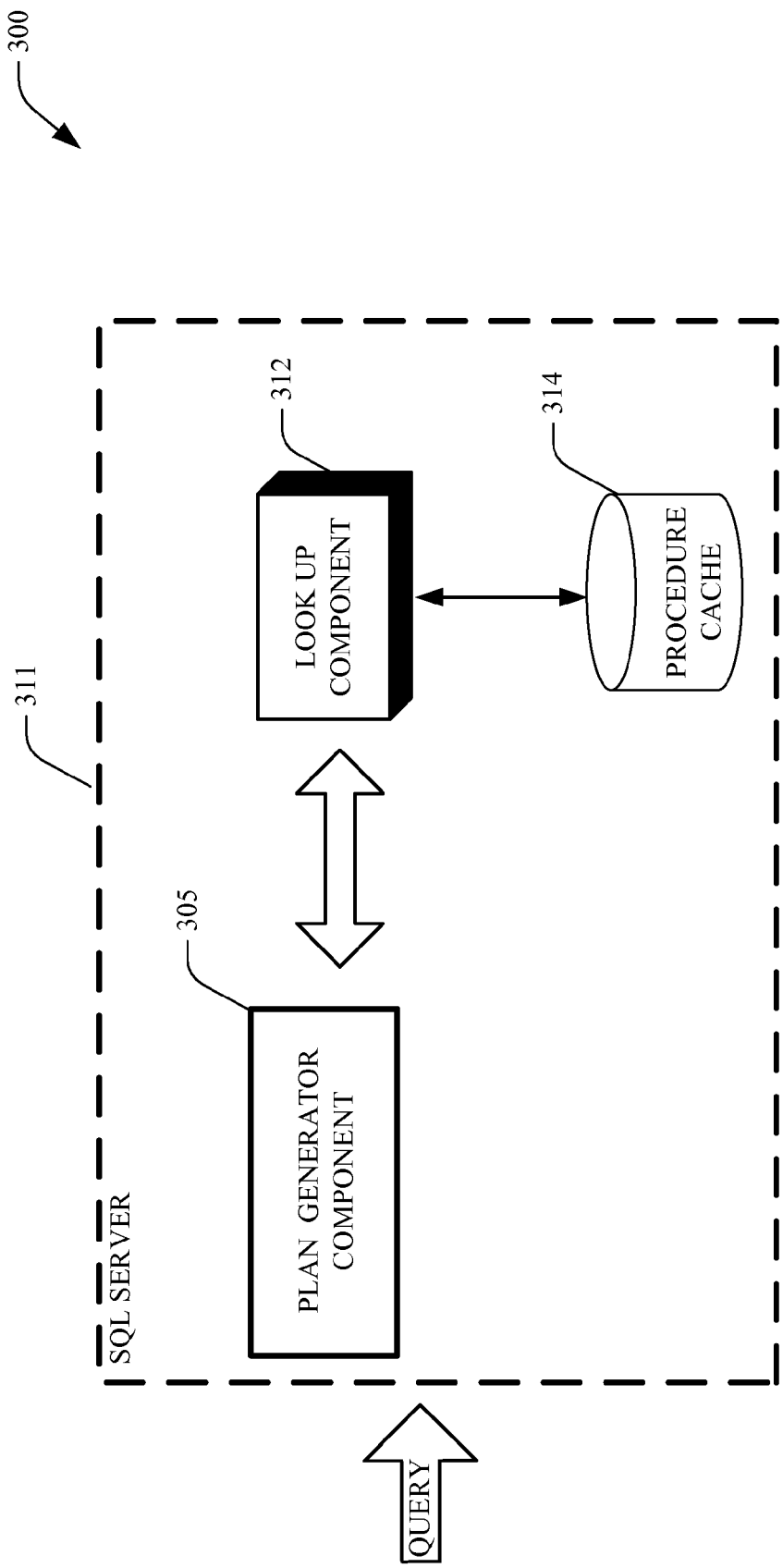
FIG. 3 illustrates a related system with a look up component in accordance with a further aspect of the subject innovation.

FIG. 3 illustrates a related system 300 in accordance with a further aspect of the subject innovation, which employs a lookup component 312. The lookup component 312 can search a procedure cache to verify whether a compilation plan for a query has been previously cached. If not, such query can be compiled, wherein during the compilation process to obtain an optimal plan, the parameter values are evaluated to verify if they match the predicates. Dispatch expressions are then formed to match the query values that are evaluated. The dispatch expressions and the compiled plan can then be stored. Each query is associated with a dispatch expression, wherein such dispatch expression is evaluated to obtain an optimal execution for the query.

Hence, the next time a query is received, a procedure cache lookup is performed to locate the plan, wherein the system can determine validity for the parameter values, and ranges/intervals that an execution plan can efficiently execute can subsequently be determined. For example, the system can run the dispatch expressions and depending on a "False" or "True" result, a decision is made to recompile the query or not (e.g., whether new dispatch expressions should be formed.) Hence, the dispatch expressions can specify which execution plan should be chosen from a plurality of stored plans to run a query.

Figure 4:
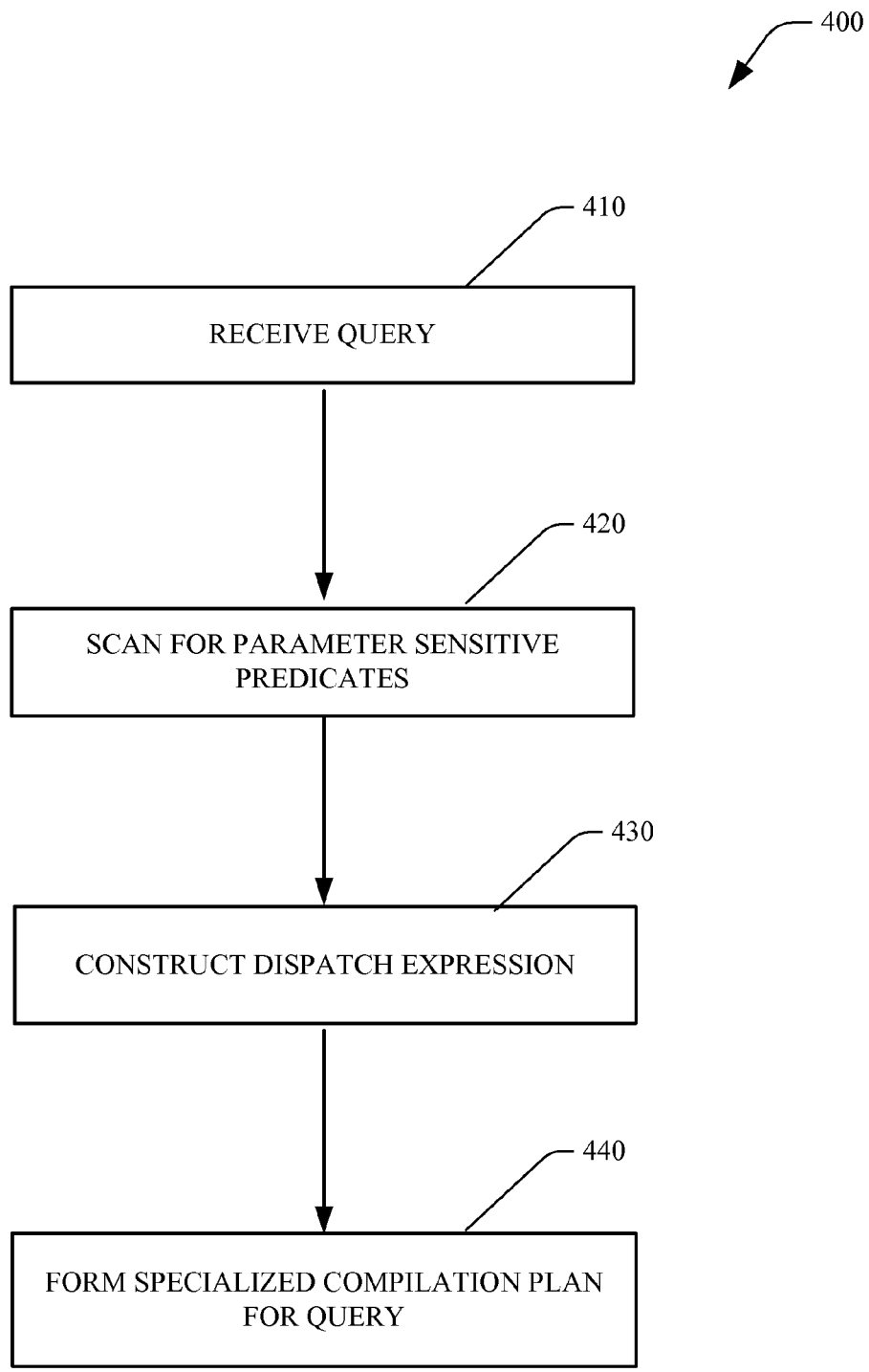
FIG. 4 illustrates a methodology of executing a query by employing specialized compilation plans in accordance with an exemplary aspect of the subject innovation.

FIG. 4 illustrates a methodology of executing a query by employing specialized compilation plans in accordance with an exemplary aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, a query is received by an SQL server for an execution thereof. Next and 420, the query can be scanned for parameter sensitive scalar predicates. In general, a predicate is a Boolean-valued expression and a scalar predicate contains no sub queries. An expression is considered parameter-sensitive if it depends on constants, variables, parameters, and non-side-effecting functions, for example. Subsequently, and at 430 dispatch expressions can be constructed from list of parameter-sensitive predicates, and at 440 special query plans formed in part based on the parameter sensitive predicates.

For example, a subroutine can compute a dispatch expression from the input query, wherein such subroutine scans a representation of the query and enumerates the parameter-sensitive predicates in it. The choice is not limited to atomic predicates, and compound predicates can also be permitted. In general, presented with a choice between an eligible predicate P and a larger eligible predicate containing P (such as P AND Q), the larger one can be chosen, for example. Such predicates P1 . . . Pk (where k is an integer) can also be referred to as guards, wherein the dispatch expression is built by sewing the guards together into a single expression that evaluates to a number in the range $[0,2^k]$. Such number represents a slot number in the array of cached plans for the query. Typically, $2^k$ of such slots can exist, and a truth value for each predicate controls one bit in the binary representation of a slot number.

Accordingly, the dispatch expression can represent SQL expression, and can leverage the highly optimized SQL language expression evaluation system built-in to the query answering system, for example. Hence, evaluating the dispatch expression on a set of parameters can be readily performed. It is to be appreciated that the subject innovation encompasses an alternative to dispatch expressions, to include a Boolean combination of guard atoms in the cache key, wherein a separate cache key can exist for each specialized plan. According to a related aspect, if more than one dispatch expression is true, the first can be chosen for execution. Moreover, pairing between a parameter sensitive plan and an expression that determines a validity (e.g., a guard expression) occurs. For example if guard expression evaluation returns true, then the plan that such guard expression is paired with is considered the correct one to execute. Put differently, the dispatch expression is a collection of guard expressions that, instead of simply returning a boolean, can return a key as to which plan to execute. If a guard expression returns true, the dispatch expression can return the appropriate key that the guard expression is associated therewith. Such is an optimized version of running each guard expression in order, until a true result is returned.

Figure 5:
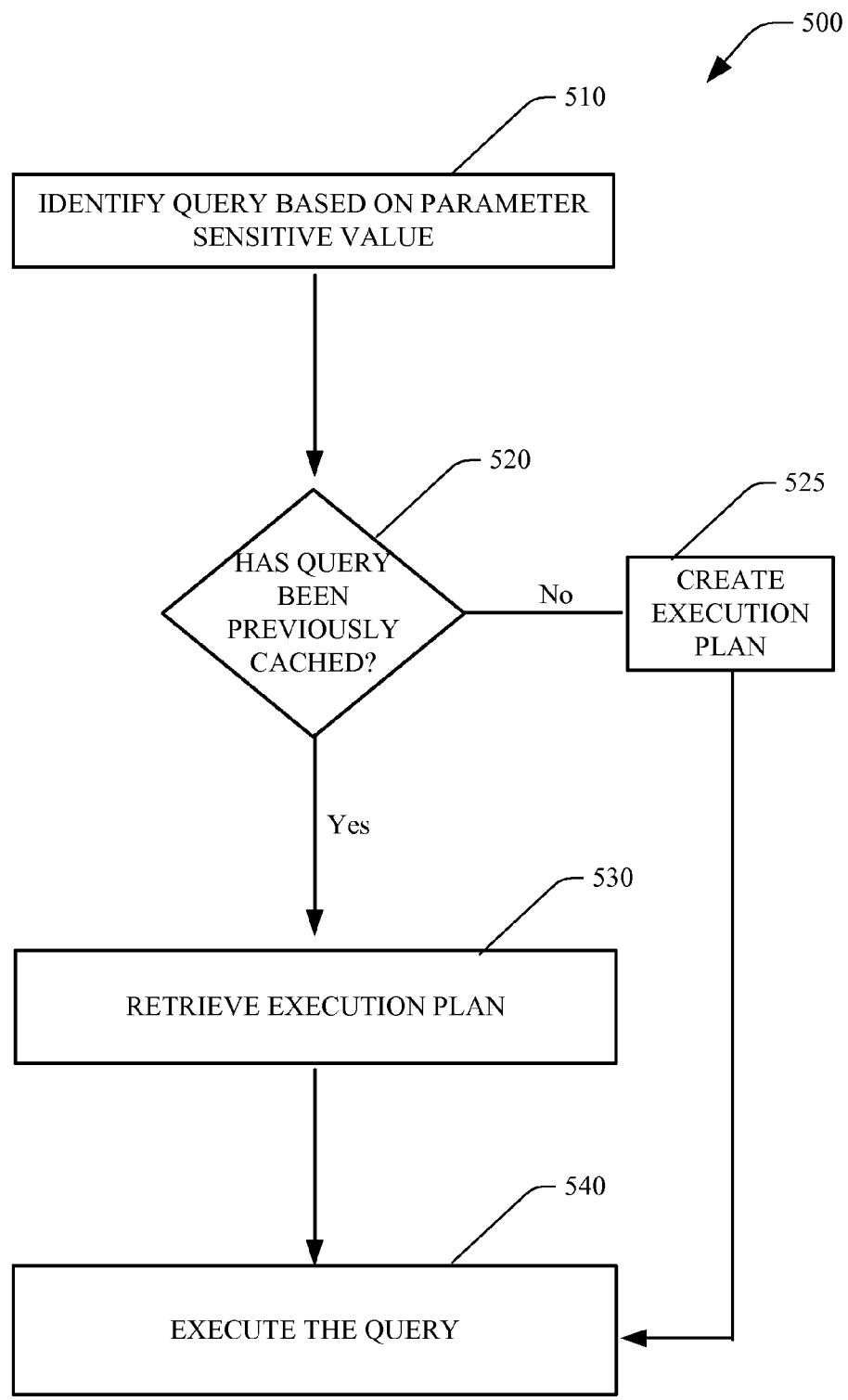
FIG. 5 illustrates a related methodology of executing a query in accordance with an aspect of the subject innovation.

FIG. 5 illustrates a related methodology 500 of executing a query in accordance with an aspect of the subject innovation. Initially and at 510, a query to be executed can be identified based on parameter sensitive value (e.g., not only based on their structures, but also based on their parameter conditions.) Subsequently and at 520 a determination is made as to whether such query has been previously executed based on specialized compilation plans. If so, and at 530 prior execution plans associated with such query are retrieved. Otherwise, and if prior execution plans do not exist, at 525 a specialized execution plan can then be created for the query. A specialized compilation plan that is tailored for the query is located and executed, or alternatively a compilation plan is created for parameter values of the query. The specialized plans are more efficient for particular values, wherein queries that employ such values can be optimally executed at 540.

For example, given a representation of a query and associated parameter, a subroutine can compute a new representation of a query specialized to such values. The subroutine scans the query representation for parameter-sensitive predicates, and evaluates each predicate individually on the parameter values. The result can be in form of a Boolean constant from the set {true, false, NULL}. Such result can be spliced back into the query in place of the predicate. The specialized query is then ready to be further compiled. In addition, subsequent scalar logic simplification acts can eliminate Boolean constants, wherein the simplified scalar logic can trigger more efficient query plan alternatives.

Figure 6:
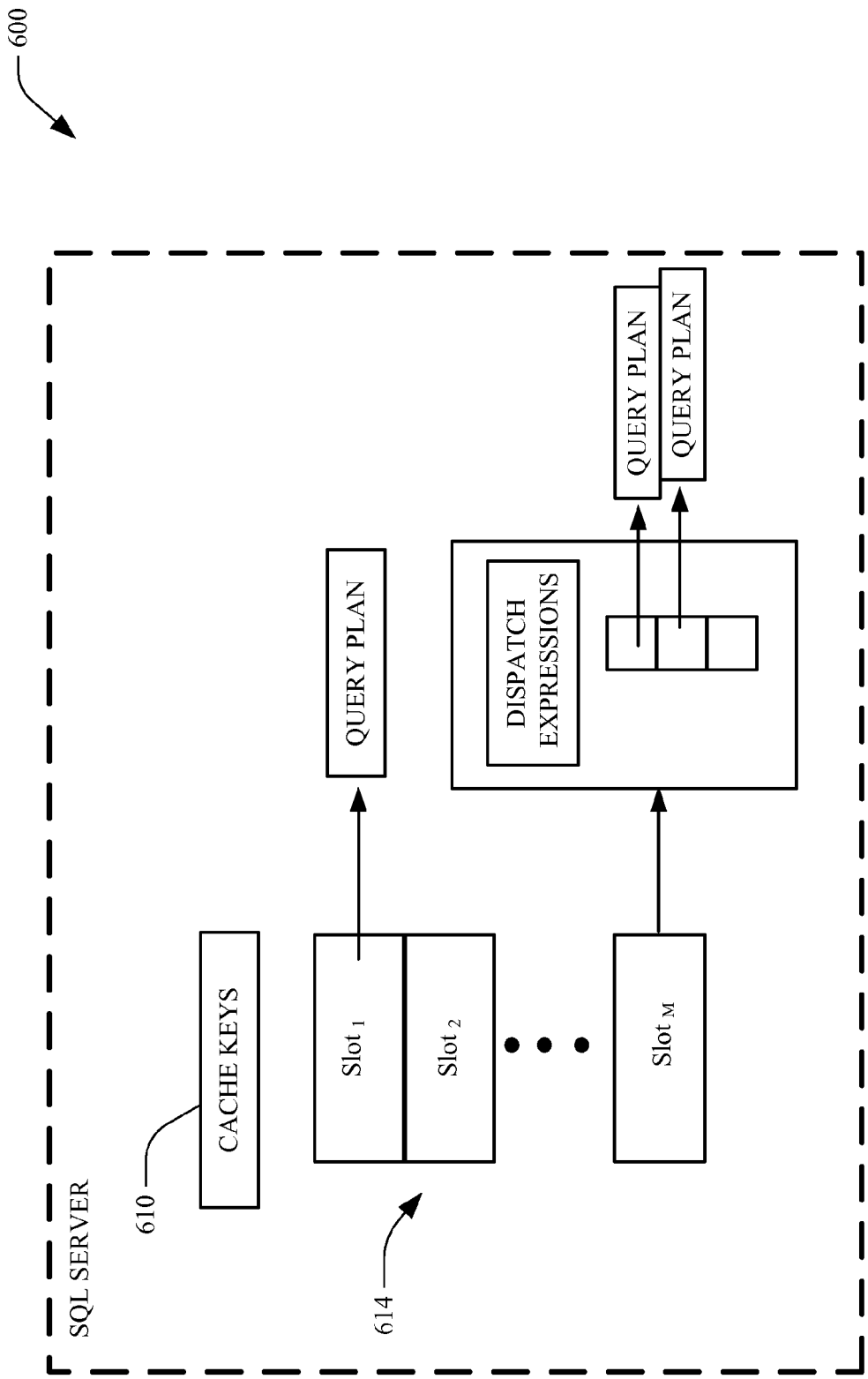
FIG. 6 illustrates a system that caches and retrieves specialized compilation plans in accordance with an aspect of the subject innovation.

FIG. 6 illustrates a system 600 that caches and retrieves specialized compilation plans in accordance with an aspect of the subject innovation. The plan cache supports lookup of a query plan, given a cache key 610 with the query text and any other bits of plan-affecting state, such as connection settings. The subject innovation involves an additional level of mapping, wherein if a cache key is found in the cache, and the query is specialized, then there will be a structure in the plan cache containing a dispatch expression and a dispatch array of query plans, as described in detail supra.

Hence, when a query arrives and its cache key has an entry, the cached structure is analyzed to determine whether it is a parameterized query. If so, the dispatch expression is evaluated on the parameter values to choose a slot 614 (1 thru M, where M is an integer). The slot is subsequently checked for a query plan, and if one exists that plan is used. Otherwise, the query needs to be specialized for the parameter values, compiled, and stored in such slot.

Moreover, if the dispatch expressions includes ANSI NULLs, =, < >, <, >, <=, and >= may return NULL. Such can lead to a slightly larger dispatch expression, for example:

```
(case when AllowAccess(@dt, user_id( )) = 1 then 0 else 1 end)
can be represented as:
(case when AllowAccess(@dt, user_id( )) = 1 then 0 else
    (case when (AllowAccess(@dt, user_id( )) = 1) is NULL then 2
else 1 end)
end)
while
(case when @actor is NULL then 0 else 1 end)
 | (case when @dir is NULL then 0 else 2 end)
 | (case when @yr is NULL then 0 else 4 end)
``` can remain as-is because typically IS NULL atoms does not return NULL.

Figure 7:
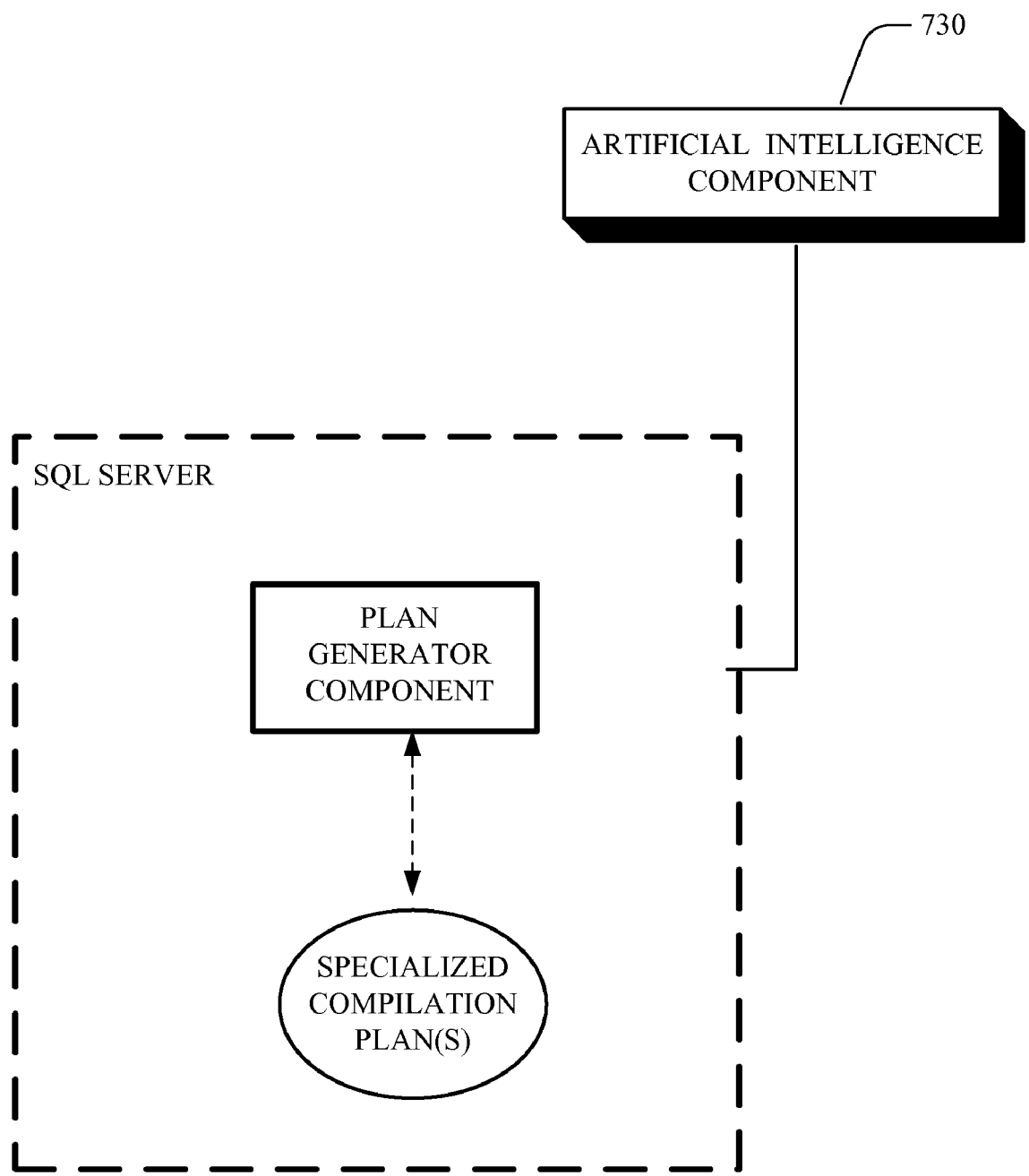
FIG. 7 illustrates an artificial intelligence (AI) component that facilitates selection of a specialized plan in accordance with an aspect of the subject innovation.

FIG. 7 illustrates an artificial intelligence (AI) component 730 that can be employed to facilitate inferring and/or determining when, where, how to generate specialized compilation plans in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 730 can employ any of a variety of suitable AI-based schemes as described supra in connection with facilitating various aspects of the herein described invention. For example, a process for learning explicitly or implicitly how specialized plans are to be created based on parameter sensitive values can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=conjidence(class)$.

Figure 8:
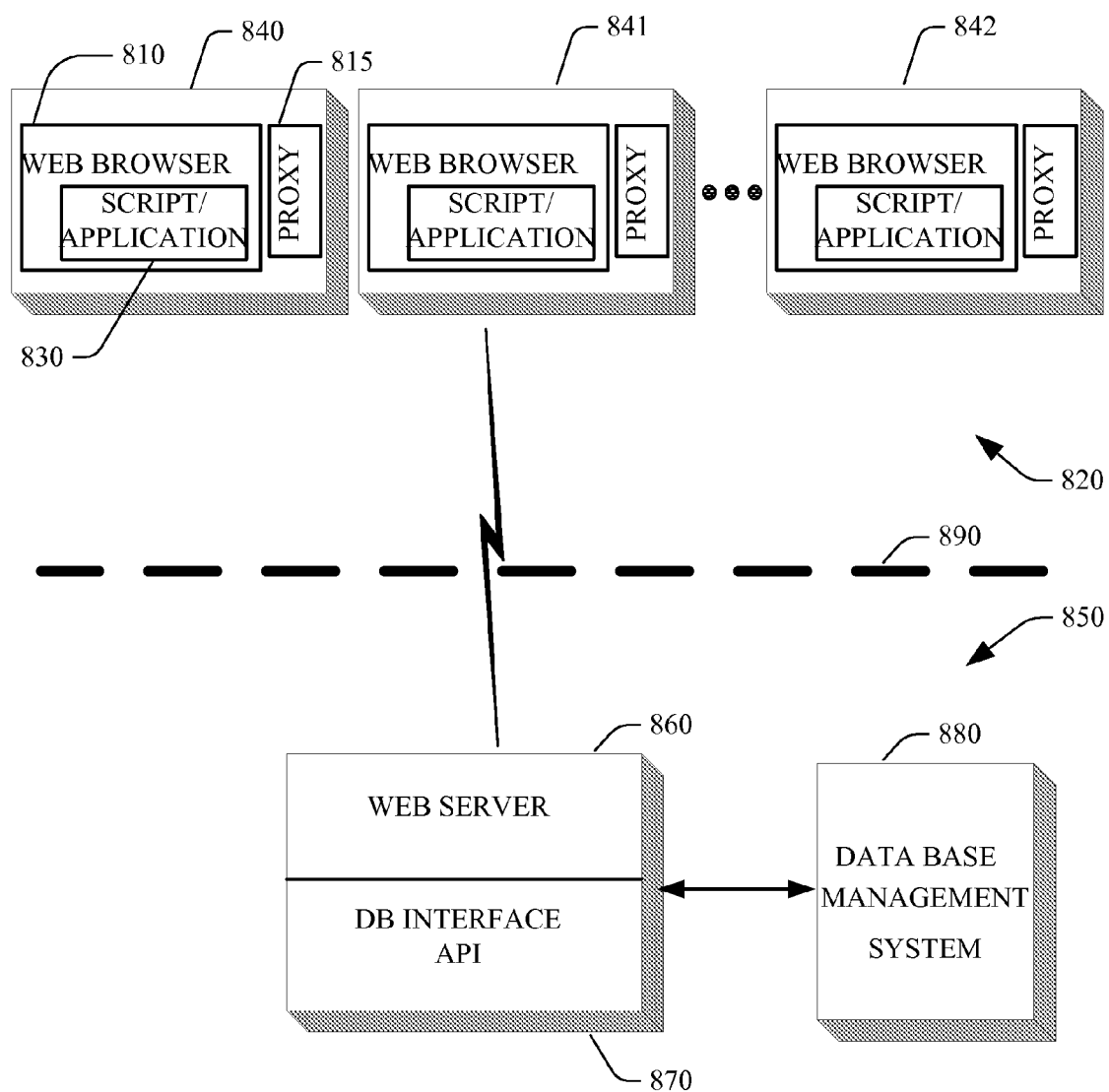
FIG. 8 illustrates a plurality of clients that employ specialized plan generation for execution of associated SQL statements.

FIG. 8 illustrates a plurality clients 840, 841, 842 that require specialized plans for compiling associated SQL queries forwarded to the server side 850 in accordance with an aspect of the subject innovation, wherein running on each of the clients 840, 841, 842 can be a client process, for example, a web browser 810. Likewise, running on the server 850 can be a corresponding server process, for example, a web server 860. In addition, embedded in the Web Browser 810 can be a script or application 830, and running within the run-time environment 840 of the client side 820, can exist a proxy 815 for packaging and unpacking data packets formatted. Communicating with the server 850, which incorporates fuzzing capabilities as part thereof, is a database management system (DBMS) 880, which manages access to a database (not shown). The DBMS 880 and the database (not shown) can be located in the server itself, or can be located remotely on a remote database server (not shown). Running on the Web server 860 is a database interface Applications Programming Interface (API) 870, which provides access to the DBMS 880. The client computer 820 and the server computer 850 can communicate with each other through a network 890. It is to be appreciated that other arrangements are also possible, for example the client computer and the server computer being the same computer. When the client process, e.g., the Web browser 810, requests data from a database, the script or application 830 issues a query, which is sent across the network (e.g. internet) 890 to the server computer 850, where it is interpreted by the server process, e.g., the Web server 860. The client's 820 request to server 850 can contain multiple commands, and a response from server 850 can return a plurality of result sets.

In such communication, session, presentation, and application service elements can be provided by Tabular Data Stream (TDS). Since TDS does not require any specific transport provider, it can be implemented over multiple transport protocols and the network 890. Responses to client commands that are returned can be self-describing, and record oriented; (e.g., the data streams can describe names, types and optional descriptions of rows being returned.)

On the client side 820 the data can be a Structured Query Language (SQL) command being in a language that the server side 850 can accept, a SQL command followed by its associated binary data (e.g., the data for a bulk copy command), or an attention signal. When a connection is desired, the client 820 can send a connection signal to the server. Even though the client 820 can have more than one connection to the server 850, each connection path can be established separately and in the same manner.

Once the server 850 has received the connection signal from the client 820 it will notify the client that it has either accepted or rejected the connection request. Likewise to send SQL command or batch of SQL commands, then the SQL command (e.g., represented by a Unicode format) can be copied into the data section of a buffer and then sent to the SQL Server side 850. A specialized compilation plan that is tailored for the associated SQL queries can then be located and executed, or alternatively a compilation plan is created for parameter values of the query. The specialized plans are more efficient for particular values, wherein queries that employ such values are optimally executed. The specialized plans are more efficient for particular values, wherein queries that employ such values are optimally executed.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
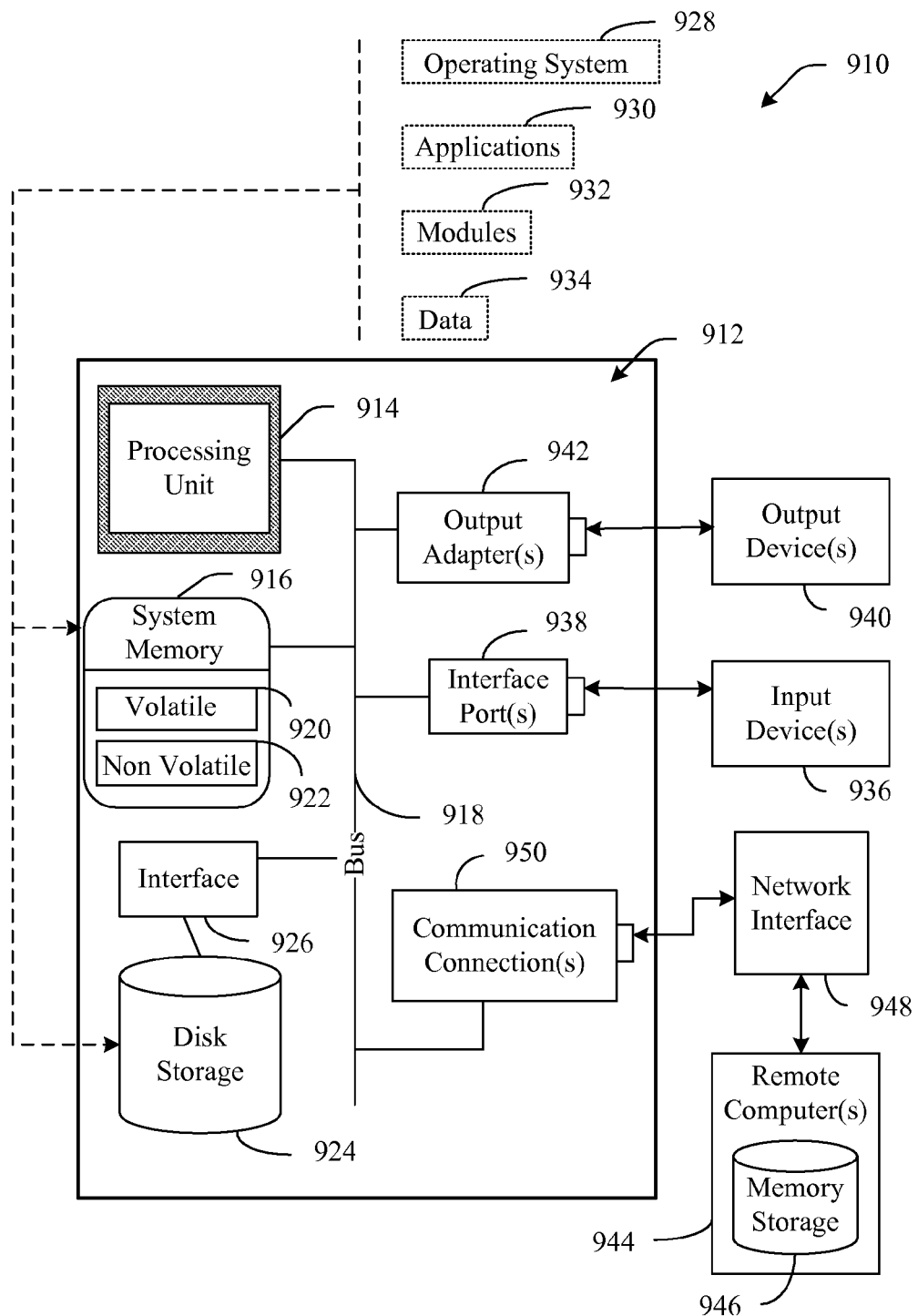
FIG. 9 illustrates an exemplary environment for implementing various aspects of the subject innovation.
Figure 10:
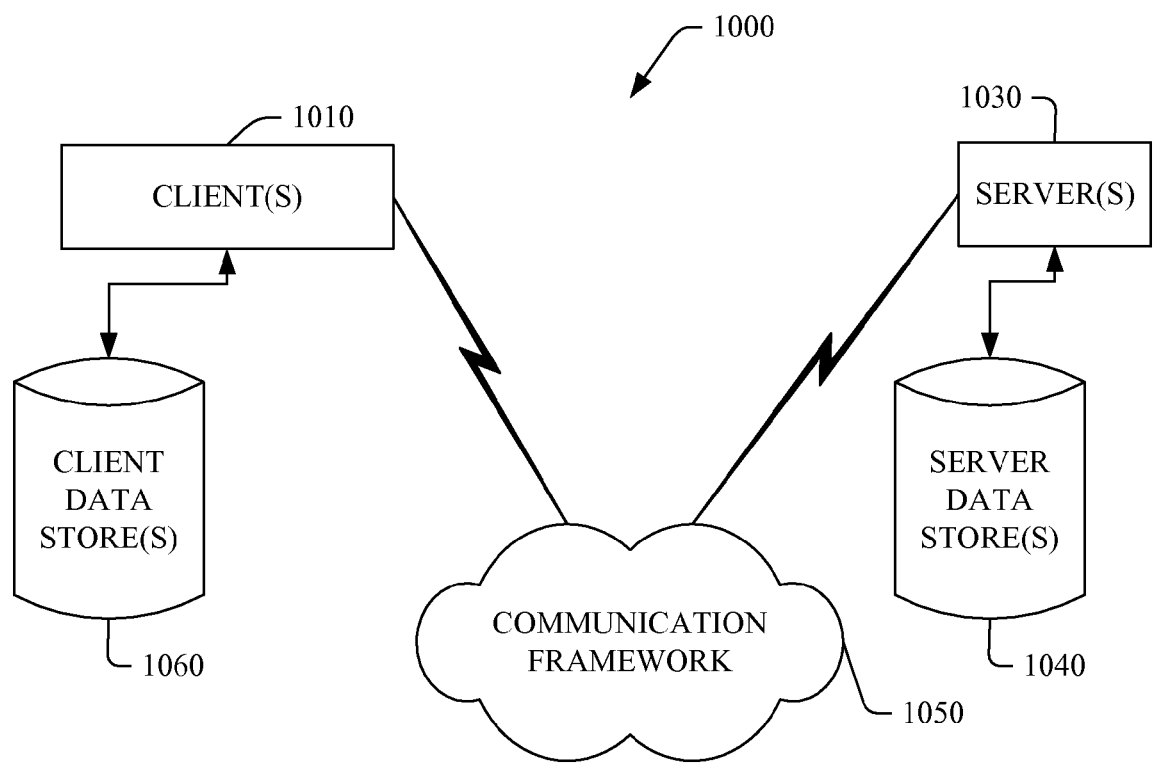
FIG. 10 is a schematic block diagram of a sample-computing environment that can be employed for specialized query plan generation according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing specialized compilation plans of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
   a processor;
   a plan generator component configured to scan a representation of a query for parameter sensitive predicates;
   one or more specialized plans generated based, at least, on the parameter sensitive predicates, wherein the one or more specialized plans is configured to execute the query;
   one or more guard expressions configured to:
      evaluate a validity of pairing at least one of the one or more specialized plans with the query, wherein a guard expression is paired with a specialized plan; and
      output a Boolean value indicative of a determination that at least one of the one or more specialized plans paired with the guard expression is proper for execution of the query;
   one or more dispatch expressions configured to match one or more query values, wherein at least one of the one or more dispatch expressions is configured to:
      include a plurality of the one or more guard expressions; and
      output a key identifying a one of the one or more guard expressions outputting the Boolean value indicative of the determination that at least one of the one or more specialized plans is proper for execution of the query, wherein the one or more dispatch expression is configured to output the key based, at least, on receiving the Boolean value indicative of the determination that at least one of the one or more specialized plans is proper for execution of the query; and
   a computer-readable storage medium storing instructions that, when executed by the processor, cause the processor to implement at least one of the plan generator component, the one or more specialized plans, the one or more dispatch expressions or the guard expression.

2. The computer-implemented system of claim 1, further comprising a procedure cache configured to store the one or more specialized plans.

3. The computer-implemented system of claim 2, further comprising a lookup component configured to search the procedure cache for the one or more specialized plans.

4. The computer-implemented system of claim 2, further comprising a query component configured to extract query predicates for the plan generator component.

5. The computer-implemented system of claim 2, further comprising an artificial intelligence component configured to facilitate generation of the one or more specialized plans.

6. The computer-implemented system of claim 1, wherein the one or more dispatch expressions is further configured:
   evaluate the one or more guard expressions in a predetermined order; and
   output the key corresponding to a guard expression first evaluated, in response to identifying a plurality of the one or more guard expressions outputting the Boolean value indicative of the determination that at least one of the one or more specialized plans is proper for execution of the query.

7. A computer-implemented method comprising:
   executing on a processor, instructions that, when executed, cause the processor to perform:
      determining a specialized compilation plan based, at least, on one or more parameter sensitive predicates of a query;

matching one or more query values, wherein the matching is performed via one or more dispatch expressions;

evaluating a validity of pairing the specialized compilation plan with the query;

outputting a Boolean value indicative of a determination that the specialized compilation plan paired with a guard expression is proper for execution of the query;

outputting a key identifying the guard expression based, at least, on receiving an output Boolean value indicative of a determination that the specialized compilation plan paired with a guard expression is proper for execution of the query; and executing the query based, at least, on the specialized compilation plan.

8. The computer-implemented method of claim 7, further comprising scanning the query for the one or more parameter sensitive predicates.

9. The computer-implemented method of claim 7, further comprising identifying the query based, at least, on a parameter sensitive value.

10. The computer-implemented method of claim 9, further comprising determining whether the query has been previously executed.

11. The computer-implemented method of claim 9, wherein the specialized compilation plan is cached prior to the determining the specialized compilation plan, the method further comprising retrieving the specialized compilation plan from a cache.

12. The computer-implemented method of claim 9, further comprising verifying that the query is a parameterized query.

13. The computer-implemented method of claim 12, further comprising extracting one or more query predicates from the query.

14. The computer-implemented method of claim 7, wherein the query is input to a system, and wherein the determining the specialized compilation plan based, at least, on one or more parameter sensitive predicates of the query is based, at least, on inferring a state of the system.

15. The computer-implemented method of claim 7, further comprising:

generating one or more Boolean constants, wherein the one or more Boolean constants is from a set including: a constant indicative of a true value, a constant indicative of a false value and a constant indicative of a null value; and providing a generated one of the one or more Boolean constants as a one of the one or more parameter sensitive predicates of the query.

16. The computer-implemented method of claim 15, further comprising eliminating at least one of the one or more Boolean constants.

17. A computer-readable storage medium storing computer-executable instructions for performing:

retrieving one or more specialized plans from a cache, wherein the one or more specialized plans is based, at least, on one or more parameter sensitive predicates of a query;

evaluating a validity of pairing at least one of the one or more specialized plans with the query;

outputting a Boolean value indicative of a determination that at least one of the one or more specialized plans paired with a guard expression is proper for execution of the query, wherein the outputting is performed by the guard expression;

outputting a key identifying the guard expression outputting the Boolean value indicative of the determination that at least one of the one or more specialized plans is proper for execution of the query; and executing the query employing the at least one specialized plan.

* * * * *